US008417564B2

(12) United States Patent
Kelly et al.

(10) Patent No.: US 8,417,564 B2
(45) Date of Patent: Apr. 9, 2013

(54) METHOD FOR ALLOCATING ADVERTISING RESOURCES

(75) Inventors: Thomas Kelly, Dade City, FL (US); Nicholas M. Kiefer, Ithaca, NY (US); Michael Lukianoff, Tampa, FL (US); Iassena Stratieva, Tampa, FL (US)

(73) Assignee: Revenue Management Solutions, Inc., Tampa, FL (US)

( * ) Notice: Subject to any disclaimer, the term of this patent is extended or adjusted under 35 U.S.C. 154(b) by 1405 days.

(21) Appl. No.: 10/972,342

(22) Filed: Oct. 26, 2004

(65) Prior Publication Data

US 2006/0010022 A1 Jan. 12, 2006

Related U.S. Application Data

(63) Continuation of application No. 10/888,068, filed on Jul. 12, 2004, now abandoned, which is a continuation of application No. 10/292,536, filed on Nov. 13, 2002.

(60) Provisional application No. 60/331,216, filed on Nov. 13, 2001.

(51) Int. Cl.
G06Q 30/00 (2012.01)
(52) U.S. Cl. ....................................... 705/14.1
(58) Field of Classification Search .............. 705/14, 705/14.1
See application file for complete search history.

(56) References Cited

U.S. PATENT DOCUMENTS

| | | | | |
|---|---|---|---|---|
| 4,930,011 | A | 5/1990 | Kiewit | 358/84 |
| 5,446,919 | A | 8/1995 | Wilkins | 455/6.2 |
| 5,521,813 | A | 5/1996 | Fox et al. | 705/8 |
| 5,636,346 | A | 6/1997 | Saxe | 395/201 |
| 5,724,521 | A | 3/1998 | Dedrick | 395/226 |
| 5,848,396 | A | 12/1998 | Gerace | 705/10 |
| 5,960,407 | A * | 9/1999 | Vivona | 705/7.33 |
| 6,006,197 | A | 12/1999 | d'Eon et al. | 705/10 |
| 6,009,409 | A | 12/1999 | Adler et al. | 705/14 |
| 6,032,123 | A | 2/2000 | Jameson | 705/8 |
| 6,044,357 | A | 3/2000 | Garg | 705/10 |
| 6,061,660 | A | 5/2000 | Eggleston et al. | 705/14 |
| 6,223,215 | B1 | 4/2001 | Hunt et al. | 709/217 |
| 6,269,361 | B1 | 7/2001 | Davis et al. | 707/3 |
| 6,493,681 | B1 | 12/2002 | Tertiski et al. | 705/36 |
| 6,567,786 | B1 | 5/2003 | Bibelnieks et al. | 705/14 |
| 7,143,075 | B1 * | 11/2006 | Chickering et al. | 706/47 |
| 2002/0116348 | A1 | 8/2002 | Phillips et al. | 705/400 |
| 2003/0028417 | A1 | 2/2003 | Fox | 705/10 |
| 2003/0078832 | A1 | 4/2003 | Alvarez et al. | 705/10 |
| 2003/0220830 | A1 * | 11/2003 | Myr | 705/10 |

\* cited by examiner

*Primary Examiner* — Daniel Lastra
(74) *Attorney, Agent, or Firm* — Baker & Hostetler LLP

(57) ABSTRACT

A method of allocating advertising resources uses a database that includes a number of business unit characteristics, one being an average allocation of advertising costs over time. A regression coefficient is produced based on the characteristics, wherein a non-linear specification is used for the average allocation of advertising cost characteristic. An impact indicator is assigned based on the how positive the regression coefficient is so that the effect of each characteristic on sales/profits and quantity sold can be determined.

12 Claims, 2 Drawing Sheets

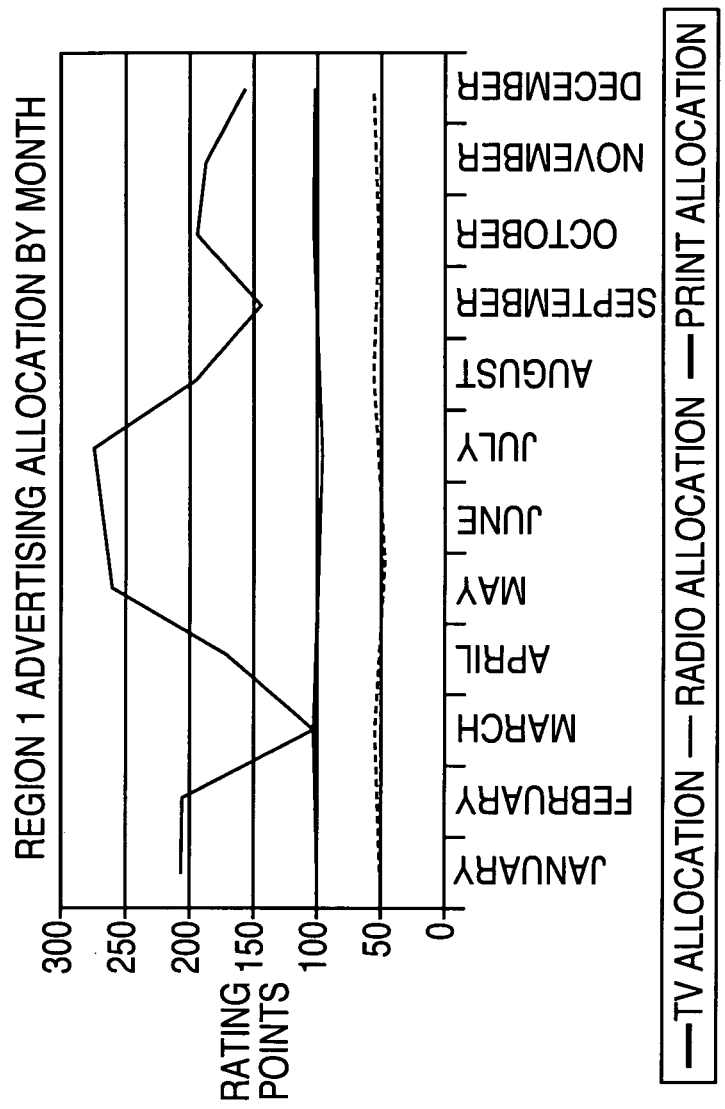

METHOD FOR ALLOCATING ADVERTISING RESOURCES

This application is a continuation of U.S. patent application Ser. No. 10/888,068, titled "Method for Allocating Advertising Resources," filed on Jul. 12, 2004 now abandoned, which is a continuation of U.S. patent application Ser. No. 10/292,536, titled "Method for Allocating Advertising Resources," filed Nov. 13, 2002, which claims priority to U.S. Provisional Patent Application No. 60/331,216 titled "Method for Allocating Advertising Resources," filed on Nov. 13, 2001.

This application claims priority under 35 USC 119(e) based on provisional patent application No. 60/331,216 filed on Nov. 13, 2001.

FIELD OF THE INVENTION

The present invention is directed to a method for allocating advertising resources, and in particular, to a method that looks at advertisements in terms of the advertising characteristics rather than the type of advertising.

BACKGROUND ART

In the prior art, it is common to analyze sales or profits based on a particular type of a promotion. For example, a promotion may involve a Disney® movie wherein a toy or figure is given away with the purchase of one or more items.

One problem facing retail chains, restaurant chains, and franchise operations when promoting their business is being able to efficiently allocating scarce dollars to advertising. Allocation decisions include the outlet (radio, TV), the level of advertising or target rating points(TRP), geographical distribution (North/South, for example) and calendar allocation (summer/winter advertising, for example).

One specific problem in this type of analysis is that the promotions vary so that it is difficult to determine what aspects of the promotion affect sales.

Consequently, improvements are needed in determining what should be promoted and when. This invention covers a quantitative method for. determining the efficient allocation of advertising characteristics, i.e., what to promote when. The solution is achieved by looking at the characteristics of the promotions rather than the promotions themselves.

SUMMARY OF THE INVENTION

It is a first object of the, present invention to provide a solution to the problem of efficiently allocating advertising resources.

Another object of the invention is a method of allocating advertising resources through the use of regression analysis, and particularly a multiple regression analysis that uses a non-linear specification that permits calculating the marginal effect of advertising allocations on sales.

Yet another object of the invention is the ability to identify the impact on sales and quantity sold of a number of variables that relate to characteristics of the business, rather than promotions, which may not necessarily be strictly business-related.

Other objects and advantages of the present invention will become apparent as a description thereof proceeds.

The inventive method uses historical data on sales (or profits) and traffic (or quantity sold) across units combined with information on advertising. The effect of different characteristics of advertising campaigns can then be isolated. By using a nonlinear specification, for example of the effect of TRP on profits, the optimum level of TRPs can be calculated. The marginal profit associated with additional TRPs can be calculated on a time basis, e.g., a month-by-month basis, for different geographical regions.

Multiple regression analysis is used to determine which promotional characteristics relate to revenue and quantity sold for the system, e.g., the relative effectiveness of TRPs in each month and which promotional characteristics relate to sales and customer counts in each month.

By using a non-linear statistical analysis, marginal effects can be determined, and these marginal effects can be of great significance in allocating advertising resources. More specifically, once the marginal effects are known, a business can determine whether advertising should be reallocated so that advertising in times of minimal marginal effects can be repositioned into zones where the marginal effects are the greatest. Alternatively, one can allocate additional advertising dollars that may be available where marginal effects are the greatest.

BRIEF DESCRIPTION OF THE DRAWINGS

Reference is now made to the drawings of the invention wherein:

FIG. 2 is a graphical representation comparing rating points against advertising allocation by month.

DESCRIPTION OF THE PREFERRED EMBODIMENTS

Figure 1:
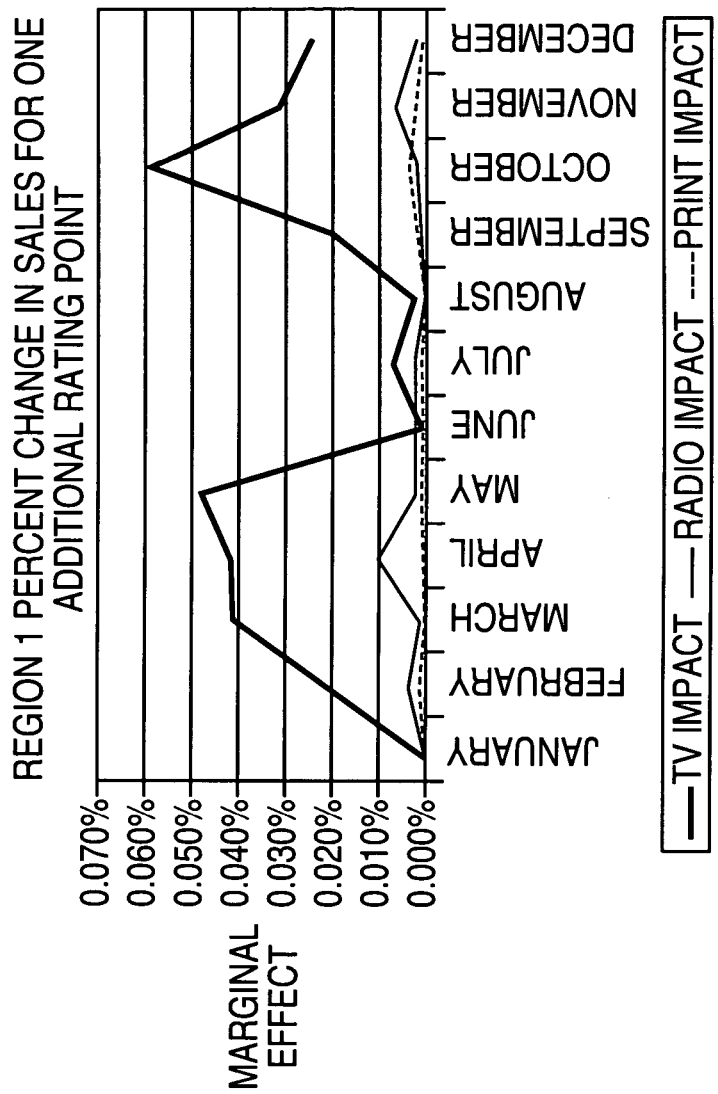
FIG. 1 is a graphical representation is comparing marginal effect in change in sales over time for TV, radio, and print.

The invention offers significant advantages in the marketing of businesses because it gives store or business unit owners the ability to isolate characteristics or variables that effect sales and quantity of goods sold. This allows adjustment of the store operation to either emphasize certain variables or de-emphasize other variables, and whether such adjustment should be done in specific regions. The invention also has the unique capability to monitor marginal effects of advertising allocations. This permits an owner to determine whether actual advertising allocations are as effective as possible. This comparison allows the business owner to either reallocate advertising resources to time periods that show more effect or add additional resources during time periods that already show good effects.

The invention involves a number of steps in order to arrive at a point where a decision on the allocation of resources may be made.

A first step is to generate a database of sales or profits as well as traffic across units (quantity sold or customer counts) and additional advertising information. The additional advertising information can be variables such as promotion name, promoted item, promoted item selling price, depth of deal, promotion duration, average sales volume, average customer counts, and average TRP allocation (budgeted) for each time period, e.g., a week, a month, or other time period. With these variables, the effect of the variables can be looked at between different geographic regions, different time periods, etc.

Once this database is generated, a multiple regression analysis is performed wherein the logarithm of sales and the logarithm of quantity sold or customer counts are regressed against the list of variables. By using a regression approach, the effects of all of the characteristics are considered simultaneously. Use of the log transformation is preferred since it is statistically appealing in that the residuals (actual minus predicted value) have the interpretation of proportional deviations. The log transformation also stabilizes the variances, making the regression model more appropriate from a statistical viewpoint.

The regressing of sales and quantity sold can be done on the entire database or over short time periods such as by month. By running the regression by the month, the effects of the advertising characteristic can be more easily evaluated and is more useful for analysis. Different regions can also be regressed so that characteristic of a promotion in one region can be contrasted with the same characteristics in another region.

An important variable for regression is the level of advertising allocation or the target rating points (TRP). The TRP is a measure of the purchased target rating points representing an estimate of the component of the desired or target audience within the total audience. For example, a newspaper advertisement that is printed 10 times reaches 50% of the gross audience with only 60% in the target audience, would have 500 Gross Rating Points (GRPs.) The GRP is found by multiplying the number of times published (10) and the percent of gross audience (50%.) The TRP is then found by multiplying GRP (500 from the above example) and percent of target audience (60%) to produce 300 TRPs. The regression analysis uses a non-linear specification (preferably a quadratic specification though other non-linear specification are within the scope of the invention) of the effect of TRP on profits or quantity sold. This is important when viewing the marginal effect of the TRP. That is, the specification of the TRP variable allows a nonlinear (quadratic) effect, and thus the marginal effect of a TRP on sales or traffic is not constant (with the quadratic specification it is linear in the level of TRP). However, if the specification for the TRP variable in the regression would be linear, the marginal effect would be constant over time. With a constant marginal effect, one could not tell whether advertising allocations should be redistributed, increased or decreased. In other words, if a constant marginal effect is shown, there is no indication as to whether advertising allocation should be changed.

Usual statistical standards of significance are applied to assess the importance of the advertising characteristics. For example, a t-statistic (a standard calculation in regression) greater than 1.5 or 2 in absolute value indicates a firmly established effect. For many purposes in the sort of noisy data available in this area, a t-statistic greater than 1.5 indicates an effect worth considering. However, other values could be to determine the impact indicator, e.g., ones that are more positive than 1.5, e.g., 2, or less positive, e.g., 1.0, as would be within the skill of the art.

An example of the inventive method is shown below wherein a number of characteristics were used when regressing revenue and quantity sold in two regions. The variables investigated included TV, radio, desserts, entrees, kids, new products, low price point, and different durations of promotions, i.e., 6, 7, and 8 weeks. The log of revenues and the log of quantity sold were multiply regressed for these variables and the impact as measured by a regression coefficient or statistical variable, i.e., a t-statistic, was tabulated. These statistical variables are well known in the art and a further description is not deemed necessary for understanding of the invention. The analysis was done for two regions to allow the business unit owner to better compare the two regions in terms of what works and what does not work. The regression analysis was done for an overall sampling of data, and is summarized in the two tables shown below.

Whether effects are strong, etc. is determined according to the following Table I:

TABLE I

| Impact | Percent Change in Key Measures |
|---|---|
| Strong | Greater than 5% |
| Moderate | Between 1% and 5% |
| Weak | Between −1% and 1% |
| Negative | Less than −1% |

This table is based on the coefficients of the regression analysis and their effect on the regressed variable. The more positive the coefficient is the greater the impact. Of course, these categories could change according to client needs. It should be understood that the impact indicators, e.g., strong, weak, etc. are exemplary and other terms could be used. Similarly, depending on the database, the percent change for a given impact could also vary. For example,. percent changes above 2% could also be classified as strong.

Referring to the hypothetical example shown in Tables IIA and IIB now, it can be seen that promotions featuring items in the desserts category have the highest levels of revenue and quantity sold in Region 1, strong for revenue and moderate for quantity sold. This indicates that dessert promotions are more effective at generating revenue than at increasing the quantity sold. This also indicates that consumers who respond to the promotion are likely to purchase the featured item in addition to their normal purchase. These conclusions follow from a positive coefficient, e.g., the t-statistic on the binary variable, identifying a dessert promotion in both the sales and the traffic regression, with a higher coefficient in the sales regression.

The results of the regression analysis are exhibited in the tables listed below. These results depict the impact on revenue and quantity sold for the variables overall, or based on the entire database of information.

TABLE IIA

| | Region 1 - Overall Impact On: | |
|---|---|---|
| Variable | Revenue | Quantity Sold |
| TV | Weak | Weak |
| Radio | Weak | Weak |
| Desserts | Strong | Moderate |
| Entrees | Strong | |
| Kids | Strong | |
| New Product | Strong | |
| Low Price Point | Negative | Negative |
| 6 Week Duration | Strong | |
| 7 Week Duration | | Negative |
| 8 Week Duration | Strong | |

TABLE IIB

| | Region 2 - Overall | |
|---|---|---|
| | | Impact On: |
| Variable | Revenue | Quantity Sold |
| TV | | Weak |
| Radio | Weak | Weak |
| Desserts | | Negative |
| Entrees | Strong | |
| Kids | Negative | Negative |
| Depth of Deal | Moderate | Moderate |
| New Product | Strong | |
| Item Give Away | | Strong |
| Low Price Point | | Strong |

TABLE IIB-continued

Region 2 - Overall

| | Impact On: | |
|---|---|---|
| Variable | Revenue | Quantity Sold |
| 6 Week Duration | Strong | Strong |
| 7 Week Duration | Strong | Strong |
| 8 Week Duration | Strong | |

From these results it can be seen that Region 1 should not use price promotions, while entree and new product promotions are useful in both regions. With this information, the chain can save money by not discounting in Region 1, not promoting desserts in region 2, etc.

While the tables depict information generated when the overall data is treated, the regression analysis to determine the effect of variables can also be performed over specific time periods. For example, an analysis may show that the low price point promotions (featured item $9.99 or less) are most effective at increasing revenues and quantities sold in May in Region 1 and in February and November in Region 2. (The positive significant coefficient on the binary variable indicating low price point promotions.). This analysis would tell the business owner when to use the low price promotions and in what region, i.e., the answer to every owner's question, what to promote and when.

As described above, performing the regression analysis also permits a determination of marginal effects. As noted above, and using TRP as one of the independent variables in the analysis, the non-linear specification for the TRP can be differentiated to produce the marginal effect of the characteristic on rating points. The analysis is preferably made for different geographic regions so that one region can be compared to another. The marginal effect in terms of percent change in sales for one additional rating point is discussed below in connection with FIG. 1 as a graph for Region 1 and marginal effects.

When looking at the marginal effect of advertising on sales, it can be determined that the marginal effect of television rating points in Region 1 is highest around the months of October and November and the lowest during July. The marginal effect of radio advertising is much less significant than television advertising and print advertising has very little impact in Region 1. As stated above, these conclusions come from direct calculation of the marginal effect of TRP by differentiating aquadratic specification in the regression (other non-linear specifications for TRP are within the scope of the invention.)

FIG. 1 also shows that radio advertising is under-allocated in the months of May and June. Consideration should be given to re-allocating radio advertising from January and February to May and June for this region. (This comes again from evaluating and comparing the marginal effects).

Print advertising has very little impact in Region 1. (An insignificant coefficient overall and in each month for Region 1.)

FIG. 1 shows the aforementioned graphical presentations of the marginal effect on sales for one additional rating point, i.e., advertising allocations, over time for three characteristics. The first graph below shows the marginal effect in terms of a percent for Region 1 of one additional rating point for TV, radio, and print of a rating point. One additional rating point in TV shows a good marginal effect during the spring and fall months. Graphing the marginal effect versus time and TRP variables allows the level and effect of promotions to be easily seen.

FIG. 2 is a graph plotting the level of advertising in terms of rating points over time for the same three variables of TV, radio, and print. This graph shows that advertising allocation is fairly constant for radio and print, but varies throughout the year for TV. The generation of the advertising allocation over time allows a comparison to be made between the marginal effect of the variable on sales, and the level of the advertisings resources allocated over time.

Comparing FIGS. 1 and 2 as described above, it is clear that the low marginal effect in the spring and summer (first graph) is the result of the high allocation of resources to those months. Knowing these results, if additional advertising resources are available, it would be advisable to expend any incremental advertising dollars in the months with the highest marginal effects.

In the situation where no additional advertising dollars are available, consideration could be given to re-allocating existing advertising dollars from months with lower marginal effects to months with higher marginal effects. That is, existing advertising allocations are shifted from those months in the second graph where allocations are high to those months in the first graph where marginal effects are high. This greatly improves the business owners' ability to link advertising resources to time periods that show increased advertising results in increased sales.

Another advantage of the invention is the ability to assess the affect of a variable of the business instead of the effect of a more generic characteristic such as a promotion. This advantage lets the business owner better focus on which characteristics affect a particular store. This is vastly superior than trying to ascertain the effect of a promotion such as a Disney® movie. Identifying characteristics of the business rather than the promotion itself, the business owner can answer the question of what to promote, when, and where.

As such, an invention has been disclosed in terms of preferred embodiments thereof which fulfills each and every one of the objects of the present invention as set forth above and provides new and improved method for allocating advertising resources.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method performed by an electronic data machine for allocating advertising resources for a business, said method comprising:

generating a database to store a number of characteristics for one or more one business units, wherein at least one characteristic being an average allocation of advertising costs over a select period of time;

conducting multiple regression analysis using a logarithm of sales or profits and a logarithm of quantity sold over a time period against characteristics of promotions run by each business unit to produce a regression coefficient for each characteristic, and for each characteristic using a non-linear specification for the effect of the characteristic on sales or profits using said computer and storing results in said database;

assigning an impact indicator for each characteristic based on the regression coefficient for each characteristic, the magnitude of the impact indicator for each characteristic indicating the effect of each characteristic on the sales or profits and quantity sold;

calculating a marginal effect on sales or profits by differentiating the non-linear specification for the effect of a given characteristic and displaying the marginal effect over time for each characteristic; and allocating resources to a requisite advertising medium over a segment of time based on the calculated marginal effect.

2. The method of claim 1, further comprising comparing the marginal effect on sales or profits based on the average allocation of advertising costs over time to the actual average allocation of advertising costs for each characteristic over the same time period to determine whether high levels of advertising allocations are matching high marginal effects.

3. The method of claim 1, wherein the marginal effect and actual advertising allocations are each graphed over time as part of the comparing step.

4. The method of claim 1, wherein the time period ranges from as little as a week to a month.

5. The method of claim 1, wherein the regression coefficient is represented by a t-statistic.

6. The method of claim 1, wherein the characteristics include one or more of a promotion name, a promoted item, a promoted item selling price, an item giveaway, a depth of deal, a promotion duration, and a type of customer.

7. The method of claim 6, wherein the more positive the coefficient, the greater the impact on sales or profits, or quantity sold.

8. The method of claim 1, wherein the more positive the coefficient, the greater the impact on sales or profits, or quantity sold.

9. The method of claim 1, wherein the analysis is done based on different geographic regions.

10. The method of claim 1, wherein either the log of sales or profits and/or the log of quantity sold is used in the regression analysis.

11. The method of claim 1, wherein the average allocation of advertising costs utilizes an average target rating points allocation.

12. The method of claim 1, further comprising displaying, printing or incorporating said characteristics from said database into a document.

* * * * *